UNITED STATES PATENT OFFICE.

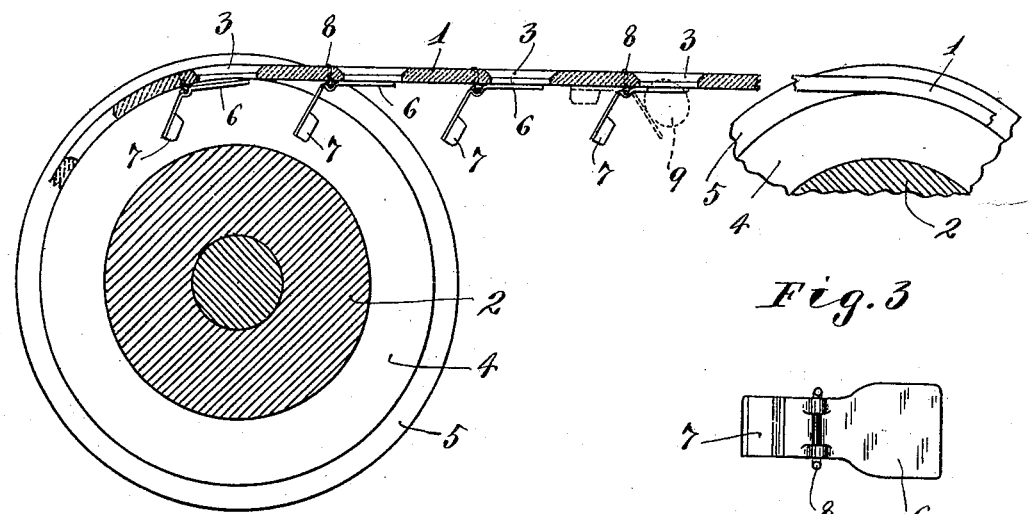
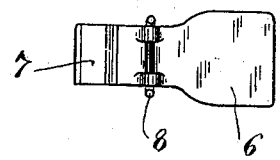
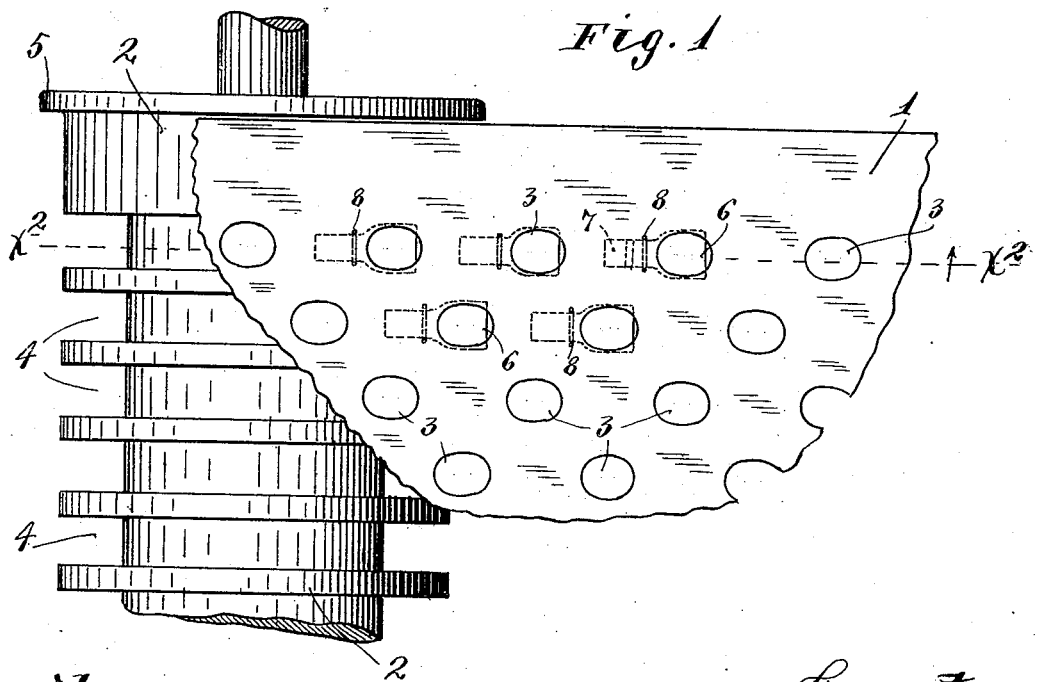

OLE SUTTER, OF ISANTI, MINNESOTA.

SORTING-BELT.

938,521.  Specification of Letters Patent.   Patented Nov. 2, 1909.

Application filed March 17, 1909. Serial No. 484,038.

*To all whom it may concern:*

Be it known that I, OLE SUTTER, citizen of the United States, residing at Isanti, in the county of Isanti and State of Minnesota, have invented certain new and useful Improvements in Sorting-Belts; and I do hereby declare the following to be a full, clear, and exact description of the invention, such as will enable others skilled in the art to which it appertains to make and use the same.

My present invention has for its object to provide an improved sorting belt, especially adapted for use in sorting beans, peas, coffee and the like, and to this end it consists of the combination of parts hereinafter described and defined in the claims.

Especially this invention is designed as an improvement on the form of sorting belt disclosed and claimed in my prior application S. N. 460,031, filed of date October 29, 1908, entitled bean sorters.

The invention is illustrated in the accompanying drawings, wherein like characters indicate like parts throughout the several views.

Referring to the drawings, Figure 1 is a fragmentary plan view showing a portion of the improved belt and a portion of one of the rollers over which the said belt is arranged to run; Fig. 2 is a vertical section taken on the line $x^2\ x^2$ of Fig. 1; and Fig. 3 is a detail showing, in bottom plan, one of the yielding bottom members or fingers of the belt.

An endless belt or apron 1, preferably constructed of leather yet capable of being made of other quite stiff yet flexible material, is arranged to run over rollers 2, one of which should be positively driven. The belt 1 is provided with a multiplicity of pockets formed by perforations 3 formed therein. These pockets 3 are arranged in rows extending longitudinally of the belt and, in line with each row of pockets, the roller 2 is provided with deep annular grooves 4 for a purpose which will presently appear. Also, the rollers 2, at their ends, are preferably formed with flanges 5 that hold the belt against lateral movements and in true positions on the said rollers.

Each pocket 3 is provided with a yielding bottom afforded by a flat pivoted finger or member 6 that is intermediately pivoted adjacent to one extremity or side of the coöperating pocket and is provided with a weighted end 7. The pivotal connection between the pivoted fingers or bottom forming members 6 and the belt 1 is preferably made by staples 8 passed through laterally pressed ears of said fingers and through the belt and having their ends clenched against the latter. The fingers 6, it will be noted, are bent so that their free or bottom forming ends may be pressed downward, as indicated by dotted lines in Fig. 2, thereby permitting an object, such as a bean, pea or coffee kernel 9, to be forced downward through the pocket in which it may be lodged. Normally, however, the weighted ends of the said fingers will hold the free ends thereof in positions to close the bottoms of the pockets which are at the upper portion of the belt. The grooves 4 in the rollers afford clearance for the pivoted fingers and permit the belt to be tightly engaged with the peripheries of the said rollers. The weighted ends of said fingers should, of course, be heavy enough to hold the fingers in working position and to support the weight of a bean, pea or kernel of coffee on the free bottom forming ends thereof. They will, however, very readily yield to a pressure of the fingers and, therefore, permit the objects to be easily and quickly forced through the pocket. There are no springs to get out of order or to be broken. Furthermore, these pivoted bottom forming fingers may be very easily and cheaply applied to the belt.

In actual practice, this improved sorting belt has been found highly efficient for the purposes had in view.

What I claim is:

1. The combination with a sorting belt or apron having a multiplicity of pockets formed by perforations therein, of pivoted gravity held fingers applied to said belt with their free ends projecting under and constituting yielding bottoms to the said pockets.

2. The combination with grooved rollers, of a sorting belt mounted to run over said rollers and provided with a multiplicity of gravity held fingers pivotally attached to said belt with their free ends constituting yielding bottoms to said pockets and arranged to pass through the grooves of said rollers.

3. The combination with a sorting belt having a multiplicity of pockets formed by perforations therein, of a multiplicity of gravity held fingers intermediately pivoted to said belt with their free ends constituting yielding bottoms to said pockets.

4. The combination with a sorting belt having a multiplicity of pockets formed by perforations therein, of a multiplicity of bent gravity held fingers having weighted ends, and staples passed through seats in the intermediate portions of said fingers and clenched to said belt adjacent to said pockets, the free ends of said fingers constituting yielding bottoms to the said pockets.

5. The combination with circumferentially grooved rollers, of a sorting belt arranged to run over said rollers and provided with a multiplicity of pockets formed by perforations therein, and a multiplicity of gravity held fingers intermediately pivoted to said belt with their free ends constituting yielding bottoms to said pockets and with their weighted ends arranged to pass through the grooves of said rollers.

In testimony whereof I affix my signature in presence of two witnesses.

OLE SUTTER.

Witnesses:
HARRY D. KILGORE,
F. D. MERCHANT.